April 27, 1926.

M. S. OWEN

COOKING OVEN

Filed May 23, 1925

M. S. Owen
INVENTOR

Victor J. Evans
ATTORNEY

WITNESS

April 27, 1926.
M. S. OWEN
COOKING OVEN
Filed May 23, 1925
1,582,532
2 Sheets-Sheet 2
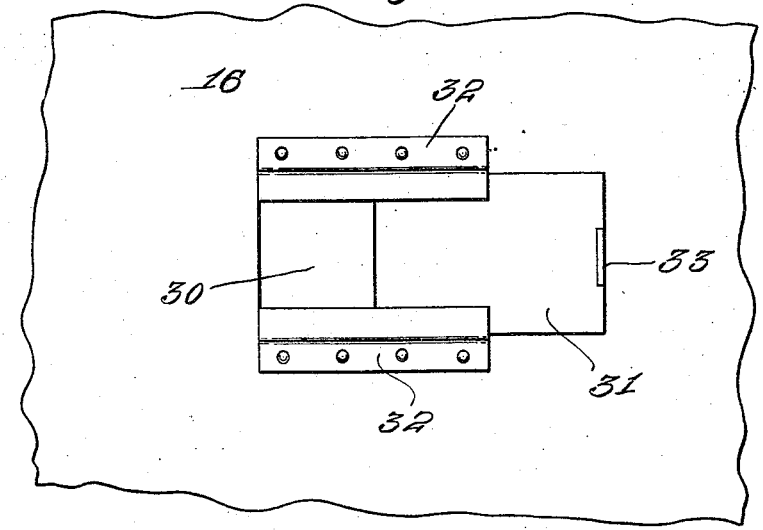
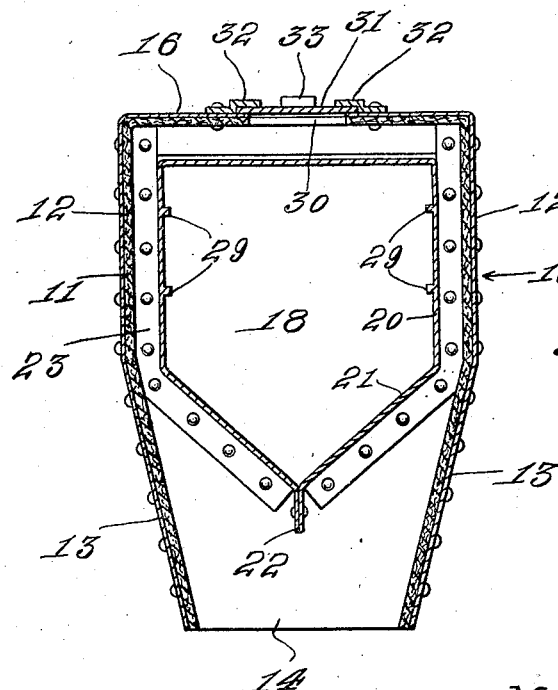
M. S. Owen
INVENTOR
By Victor J. Evans
ATTORNEY
WITNESS Patented Apr. 27, 1926.

1,582,532

UNITED STATES PATENT OFFICE.

MARTIN S. OWEN, OF CAIRO, ILLINOIS.

COOKING OVEN.

Application filed May 23, 1925. Serial No. 32,477.

*To all whom it may concern:*

Be it known that I, MARTIN S. OWEN, a citizen of the United States, residing at Cairo, in the county of Alexander and State of Illinois, have invented new and useful Improvements in Cooking Ovens, of which the following is a specification.

This invention relates to ovens, particularly those of the domestic type, and has for its object the provision of a novel oven adapted to be mounted upon the top of a coal range, gas range, oil stove or the like whereby any desired articles of food may be baked, roasted or cooked in a highly satisfactory and efficient manner.

An important object is the provision of a device of this character constructed to have outer and inner members, the food to be cooked or roasted being placed within the inner member so that fumes, smoke or the like from the stove or range cannot have access to the food and spoil the flavor thereof.

Another object is the provision of a device of this character which has its bottom portion so constructed as to fit down over the range, gas stove or the like and consequently utilize all of the heat, none being wasted as would occur under ordinary circumstances.

Yet another object is the provision of a device of this character which is provided with ventilating means whereby the degree of heat may be regulated at will depending upon the requirements of the particular food articles being cooked.

An additional object is the provision of an oven which will be simple and inexpensive in manufacture, easy to use and operate, positive in action, efficient and durable in service and a general improvement in the art.

With the above and other objects and advantages in view, the invention consists in the details of construction to be hereinafter more fully described and claimed, and illustrated in the accompanying drawings in which:—

Figure 1 is an end elevation looking toward that portion equipped with the door.

Figure 2 is a vertical longitudinal section.

Figure 3 is a vertical cross section taken on the line 3—3 of Figure 2.

Figure 4 is a fragmentary detail view showing the ventilating means or heat controller.

Figure 1:
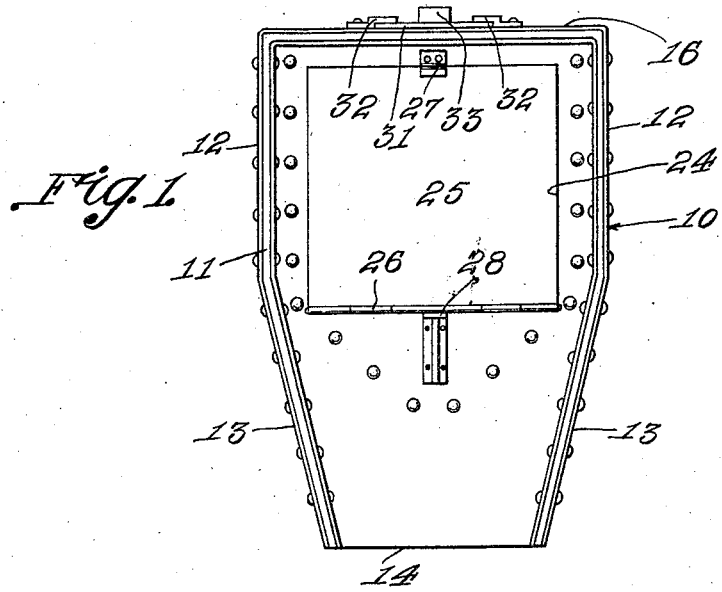
Figure 2:
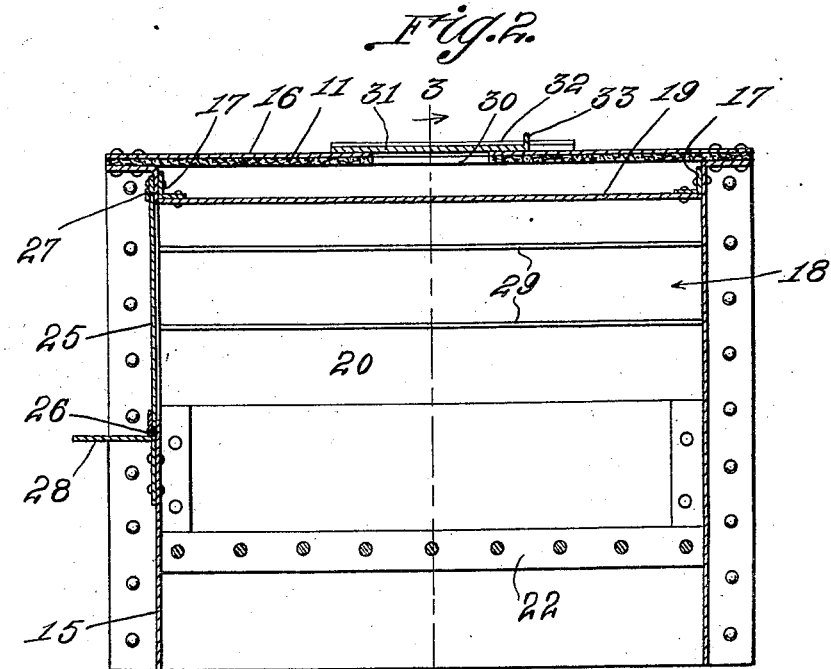

Referring more particularly to the drawings, I have shown the device as comprising an outer casing designated broadly by the numeral 10, which casing has a lining 11 of asbestos or other heat resisting material which is provided for the purpose of holding in the heat. The upper portion 12 of the casing is rectangular while the lower portion 13 tapers downwardly, the bottom 14 being open to permit entrance of the heat when the device is set upon the top of a coal range. This outer casing may be constructed of any desired number of pieces of material riveted or otherwise suitably secured together. The exact material used and also the size and shape are also matters of manufacturing preference and may be varied within wide limits within the scope of the invention. The top of the outer casing is closed by a wall member 16, and it should be stated that angular braces, indicated at 17, may be provided at any or all of the joints where necessary in order to strengthen the structure and give it the proper rigidity to withstand hard service.

The oven further includes an inner casing or compartment designated broadly by the numeral 18, which compartment includes a top wall 19 suitably secured to the end walls 15 of the outer casing. This inner casing or compartment further includes side walls 20 which are suitably secured at their ends to the end walls 15. The lower portions 21 of these side walls 20 converge and are secured at their meeting edges as shown at 22. By this specific construction it will be seen that the lower portion of the inner compartment flares outwardly as it goes upwardly to direct the heat to the space 23 between the outer and inner casings.

It is intended that the food to be cooked be placed within the inner compartment and for this reason, I have shown one end wall 15 as provided with a suitable door opening 24 normally closed by a hinged downwardly swinging door 25 mounted at 26 and having a suitable catch device 27 for holding it normally closed. Any suitable or preferred means 28 may be provided for limiting the downward swinging movement of the door when it is opened so that it will remain in horizontal position and serve as a support for the cooking pans or the like preliminary to placing them in or after removing them from the oven. It is intended that the usual supporting grids be provided, though they are not shown, and these grids may be mounted selectively upon upper or lower transversely extending cleats 29 secured to the inner faces of the side walls 20 of the inner compartment.

It is of course highly desirable that means be provided for regulating the degree of heat within the oven and for this reason, I have shown the top plate 16 of the outer casing as formed with an opening 30 adapted to be closed to a greater or less extent by means of a slidable door or plate 31 movably mounted within guides 32 located at opposite sides of the opening. This cover plate may be provided with an upturned lug 33 or any other equivalent means whereby it may be readily moved as needed. Obviously, when the opening 30 is entirely uncovered the amount of heat within the oven will be much less than when the opening is partly closed and in this way it is obvious that a fairly accurate regulation of temperature may be had.

From the foregoing description and a study of the drawings it will be apparent that I have thus provided a simply constructed, inexpensive and yet very highly efficient oven which is well adapted for household use in connection with ordinary coal ranges, gas stoves or the like, the construction being such that it is impossible for fumes, smoke, gas or other objectionable vapors to gain access to the materials being cooked so that the flavor thereof will be unimpaired.

While I have shown and described the preferred embodiment of the invention, it should be understood that I reserve the right to make such changes in the form, construction and arrangement of the parts as will not depart from the spirit of the invention or the scope of the subjoined claims.

Having thus described the invention, I claim:—

In a stove of the character described, an outer casing including a rectangular elongated upper portion and a substantially trapezoidal lower portion formed as a continuation thereof, both sides, both ends and the top of said casing being closed and the bottom being open, the closed top having an opening therein adapted to be covered to a selected extent by an adjustable plate, said outer casing being adapted to be set upon a gas stove or range, an inner casing located within the outer casing and having an elongated rectangular upper portion, with downwardly inclined converging bottom portions, all the walls of said inner casing being secured to the opposite ends of the outer casing and being spaced from the sides and top thereof whereby there will be a continuous heat chamber about the inner casing, and a door in one end of the outer casing giving access to the interior of the inner casing.

In testimony whereof I affix my signature.

MARTIN S. OWEN.